United States Patent
Chang (10) Patent No.: US 7,057,890 B2
(45) Date of Patent: Jun. 6, 2006

(54) DRAWER FOR DIGITAL DATA STORAGE DEVICE

(75) Inventor: Lin-Wei Chang, Taipei (TW)

(73) Assignee: Inventec Corporation, Taipei (TW)

( * ) Notice: Subject to any disclaimer, the term of this patent is extended or adjusted under 35 U.S.C. 154(b) by 197 days.

(21) Appl. No.: 10/671,941

(22) Filed: Sep. 29, 2003

(65) Prior Publication Data

US 2005/0073809 A1   Apr. 7, 2005

(30) Foreign Application Priority Data

Mar. 27, 2003   (TW) ............................... 92204755 U (51) Int. Cl.
*G06F 1/16*   (2006.01)
(52) U.S. Cl. ...................... 361/684; 361/685
(58) Field of Classification Search ......... 361/684–685
See application file for complete search history.

(56) References Cited

U.S. PATENT DOCUMENTS 6,421,236 B1 * 7/2002 Montoya et al. ............ 361/685
6,661,651 B1 * 12/2003 Tanzer et al. ............... 361/685

* cited by examiner

Primary Examiner—Yean-Hsi Chang
(74) Attorney, Agent, or Firm—Birch, Stewart, Kolasch & Birch, LLP (57) ABSTRACT

A drawer for a digital data storage device includes a drawer body, and two vibration absorption members detachably mounted on both sides of the drawer body. The drawer body has at least an accommodating space for receiving the digital data storage device. The two sides of the drawer body respectively have a plurality of resilient members and a plurality of first openings. A plurality of second openings and fastening portions of the vibration absorption members further respectively correspond to the resilient members and the first openings. The fastening portions of each vibration absorption member are fastened inside the corresponding first openings of the drawer body. The resilient members are exposed through the second openings to absorb tolerance in assemblage and provide effective electrical grounding. A light pipe may be further mounted in the drawer body, extending from a front end to a rear end of the drawer body.

13 Claims, 6 Drawing Sheets

DRAWER FOR DIGITAL DATA STORAGE DEVICE

This Nonprovisional application claims priority under 35 U.S.C. § 119(a) on Patent Application No(s). 092204755 filed in Taiwan on Mar. 27, 2003, the entire contents of which are hereby incorporated by reference.

BACKGROUND OF THE INVENTION

1. Field of the Invention

The present invention relates to drawers for digital data storage devices, and, more particularly, to a drawer for receiving a digital data storage device and electrically connecting the digital data storage device to an electronic device.

2. Description of the Related Art

A movable hard disk drive is very convenient for a user who works with different computer hosts. If the user wants to work conveniently at more than one location, she/he then only needs to install a drawer receptacle capable of accommodating a drawer in each computer host. The user then can place the drawer in the receptacle of the desired computer host, and electrically connect the drawer to the receptacle through a data and control connector and a power line. When a software application stored on the hard disk drive or even the hard disk drive itself fails, the hard disk drive may be quickly and conveniently replaced with a back-up digital data storage device to access the necessary data without the need of disassembling the cabinet of the computer host to remove the failed hard disk. Furthermore, use of a drawer can effect data storage updating without the need for any tools and extension card.

Since a digital data storage device, such as a hard disk drive, contains a precise and delicate mechanism, undesired vibrations may damage the digital data storage device and, consequently, alter the digital data stored therein. In order to secure the performance and the stability of the digital data storage device in association with other devices mounted in proximity of the digital data storage device in operation, especially when the digital data storage device has a high operation speed that may induce substantial vibrations, the digital data storage device has to undergo electromagnetic interference (EMI) and rotational vibration index (RVI) tests.

Figure 6:
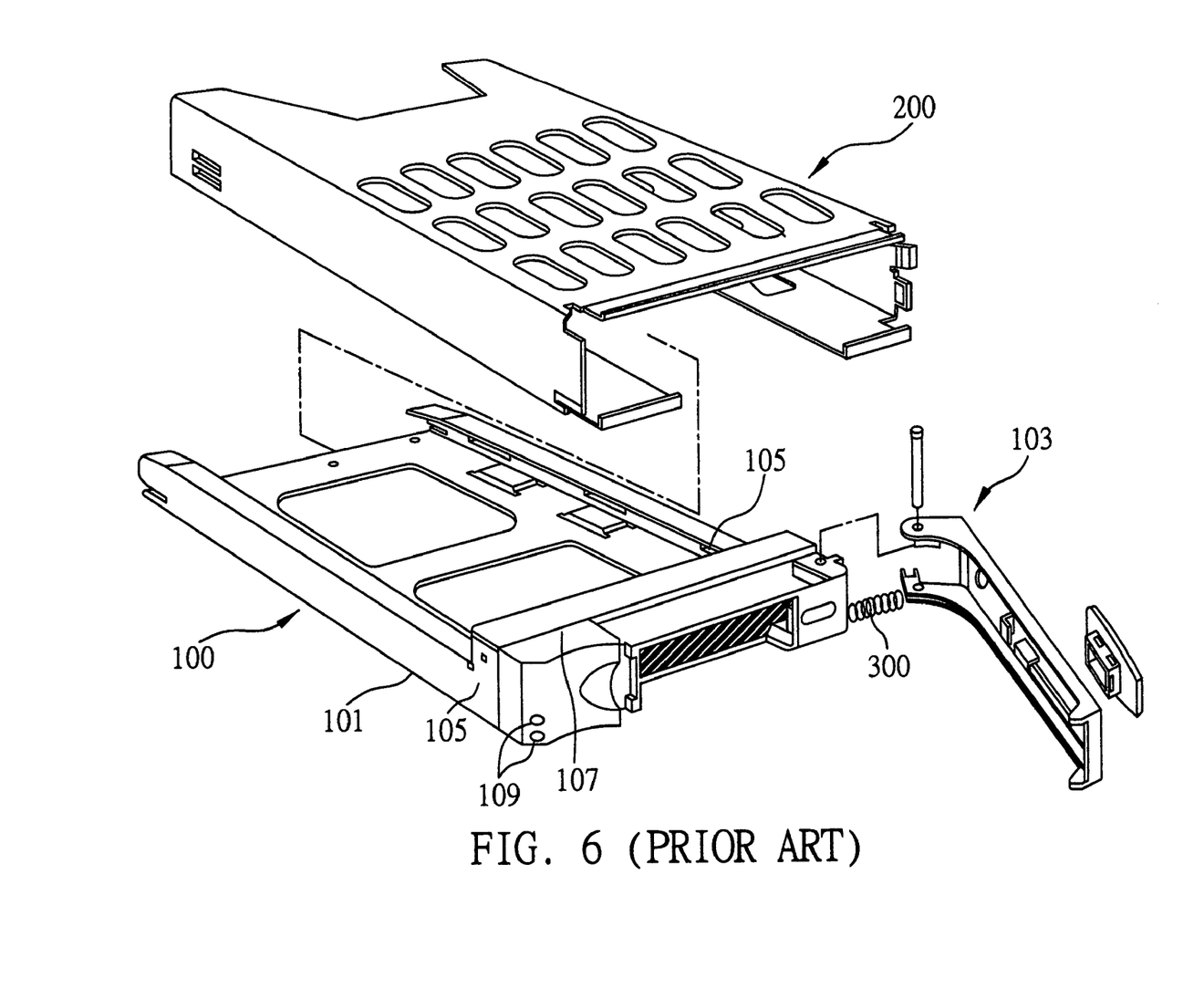
FIG. 6 (PRIOR ART) is a schematic view of a conventional drawer for a digital data storage device.

FIG. 6 shows a drawer for receiving a digital data storage medium known in the prior art. As illustrated, a drawer 100 for receiving a digital data storage device has a drawer body 101 that includes an inner rectangular space therein. The body 101 is made of, for example, a metallic material such as aluminum. A handle 103 is pivotally attached on a front side 107 of the body 101 through a screw or pin (not labeled), across a plate 105 having a pair of rectangular rails. At least one indicator light 109 is mounted near one end of the handle 103. The drawer 100 is mounted inside a fixing frame 200 that can be mounted in an electronic device (not shown) such as a computer host.

The metallic drawer is generally designed in a manner to promote heat dissipation in operation. However, it generally cannot withstand substantial impacts from operational vibration/rotation, and thus usually fails, for example, RVI tests, and is lack of the fit tolerance occurred when being assembled with a fixing member. Since the fixing member generally is also metallic, when the drawer is mounted onto the fixing member, there is a tolerance of fit (hereinafter, called as "fit tolerance") between the drawer and the fixing member during assembly.

The drawer for a digital data storage device of the prior art therefore may be seriously damaged due to the operational vibration/rotation and lack of the fit tolerance during assembly. Furthermore, no grounding exists between the drawer and the fixing member, which adversely affects the electrical performance characteristics of the computer host.

Taiwan Publication No. 505289 discloses a drawer for a digital data storage device. A rail, having a sleeve with metallic connector for electrical contact between the drawer and a chassis, is screwed on one side of drawer. The assembly/disassembly of the above drawer with/from the chassis are achieved by means of screws, panels and adequate tools. The assembly therefore is relatively complex and is time-consuming, while vibration absorption is not efficiently achieved.

The conventional drawer for a digital data storage device therefore has disadvantages such as inconvenient assembly/disassembly, time-consuming assembly/disassembly, and insufficient absorption of vibration in operation and/or fit tolerance, which may alter the digital data in the storage device and consequently affect the performance of the electronic device. Therefore, there is a need of a drawer for a digital data storage device that can overcome the above problems.

SUMMARY OF THE INVENTION

It is therefore an objective of the invention to provide a drawer for a digital data storage device that effectively absorbs vibration in operation.

It is another objective of the invention to provide a drawer for a digital data storage device that absorbs the fit tolerance and effectively achieves electrical grounding.

Furthermore, it is another objective of the invention to provide a drawer for a digital data storage device that is easily and rapidly assembled/disassembled.

In order to achieve the above and other objectives, the drawer for a digital data storage device according to the invention is suitable for use in an electronic device to electrically connect a digital data storage device to the electronic device for data transmission. The drawer includes a drawer body and two vibration absorption members detachably mounted on both sides of the drawer body.

The drawer body includes at least an accommodating space for receiving the digital data storage device. The two sides of the drawer body are respectively provided with a plurality of resilient members and a plurality of first openings. A light pipe is further mounted in the drawer body to extend from the front end to the rear end of the drawer body.

Each vibration absorption member respectively has two second openings and two fastening portions. The fastening portions are formed to respectively correspond to the first openings, so that the vibration absorption members are fastened inside the corresponding first openings in the sides of the drawer body by means of the fastening portions to provide the vibration absorption members with a cushioning effect. The resilient members respectively are exposed through the second openings to absorb the fit tolerance and provide electrical grounding.

An actuator is further pivotally mounted at the front end of the drawer body. The actuator includes a latching element, a snapping element, and a pivotal handle. The latching element allows a release between the latching element and the snapping element, so that the handle is capable of rotating between a first position A close to the front end of the drawer body and a second position B far away from the front end of the drawer body. Thereby, the digital data storage device can be retrieved from or placed in the drawer.

When the vibration absorption members are to be assembled inside the drawer body, the fastening portions of each vibration absorption member correspond to the first openings at the two sides of the body without the need of any tool. The fastening portions then are pushed into the corresponding first openings, and the resilient members respectively extend through the second openings. Thereby, the vibration absorption members are fastened with the two sides of the drawer body.

When one or both of the vibration absorption members is to be disassembled from the drawer body, the fastening portions of each vibration absorption member are separated from the first openings to disassemble each vibration absorption member from the drawer body. A new vibration absorption member can then be replaced without the need of any tools.

The drawer for a digital data storage device according to the invention is characterized in that the vibration absorption members easily absorb vibration in operation as well as the fit tolerance, and further effectively provide electrical grounding. Replacement of the vibration absorption member according to the invention can be easily achieved without any tool. Furthermore, the light pipe is designed to be linearly mounted inside the drawer for operational display purpose. Vibration and the fit tolerance can be thereby effectively absorbed, and good grounding is further provided.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief description of the drawings, which are given by way of illustration only, and thus are not limitative of the present invention, is as follows.

DETAILED DESCRIPTION OF THE PREFERRED EMBODIMENTS

FIG. 1 through FIG. 4 illustrate a drawer for a digital data storage device according to one embodiment of the invention. A drawer for a digital data storage device 1 of the invention is suitable for use in an electronic device to electrically connect a digital data storage device to the electronic device for data transmission. The drawer includes a drawer body 11 and two vibration absorption members 13 which are detachably mounted on either side of the drawer body 11.

In this embodiment, the drawer receives a digital data storage device such as a hard disk drive. The hard disk drive and the electronic device are well known in the art, and the description of their configuration and arrangement therefore is omitted herein.

Figure 1:
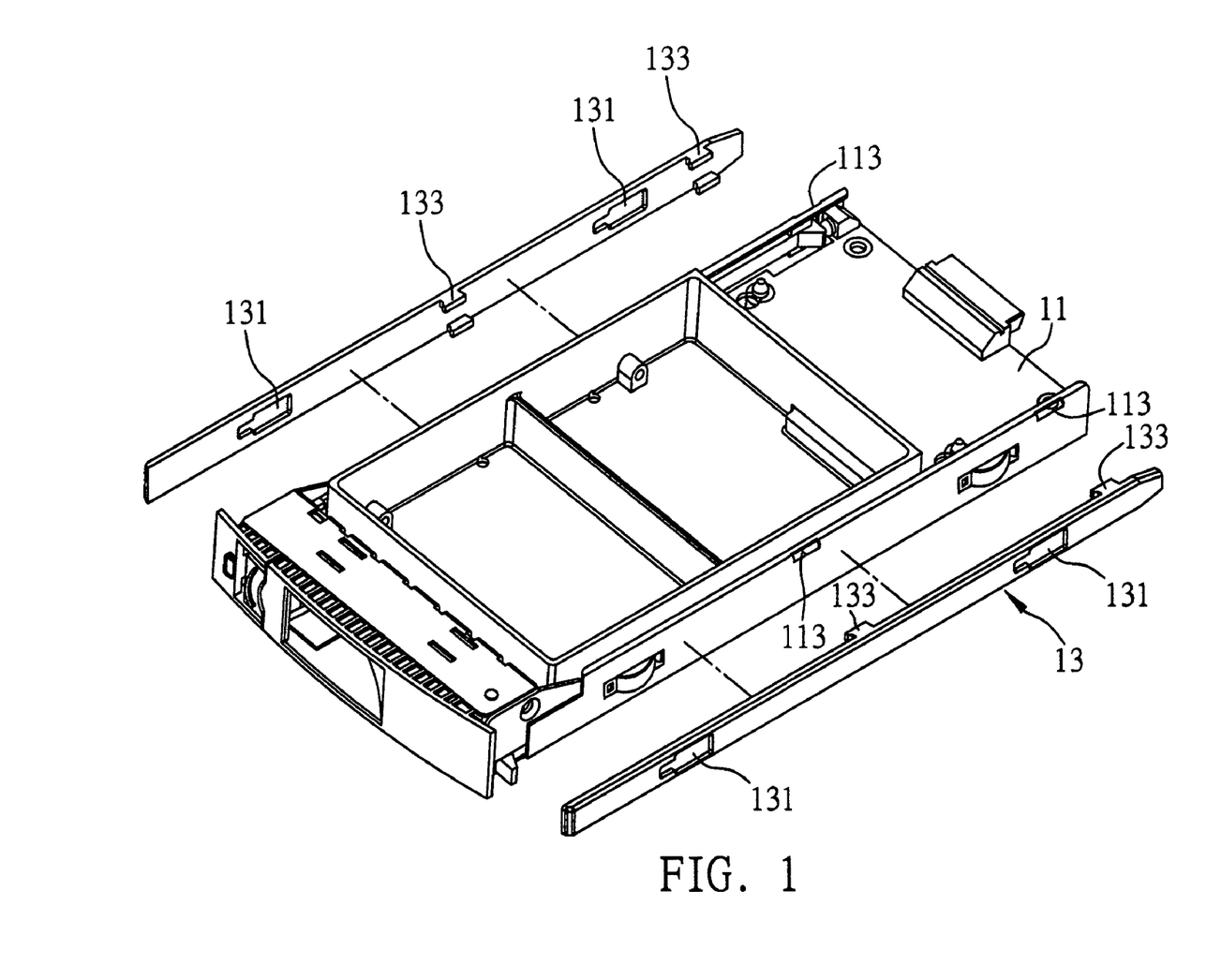
FIG. 1 is an exploded view of a drawer for a digital data storage device according to one embodiment of the invention.
Figure 2:
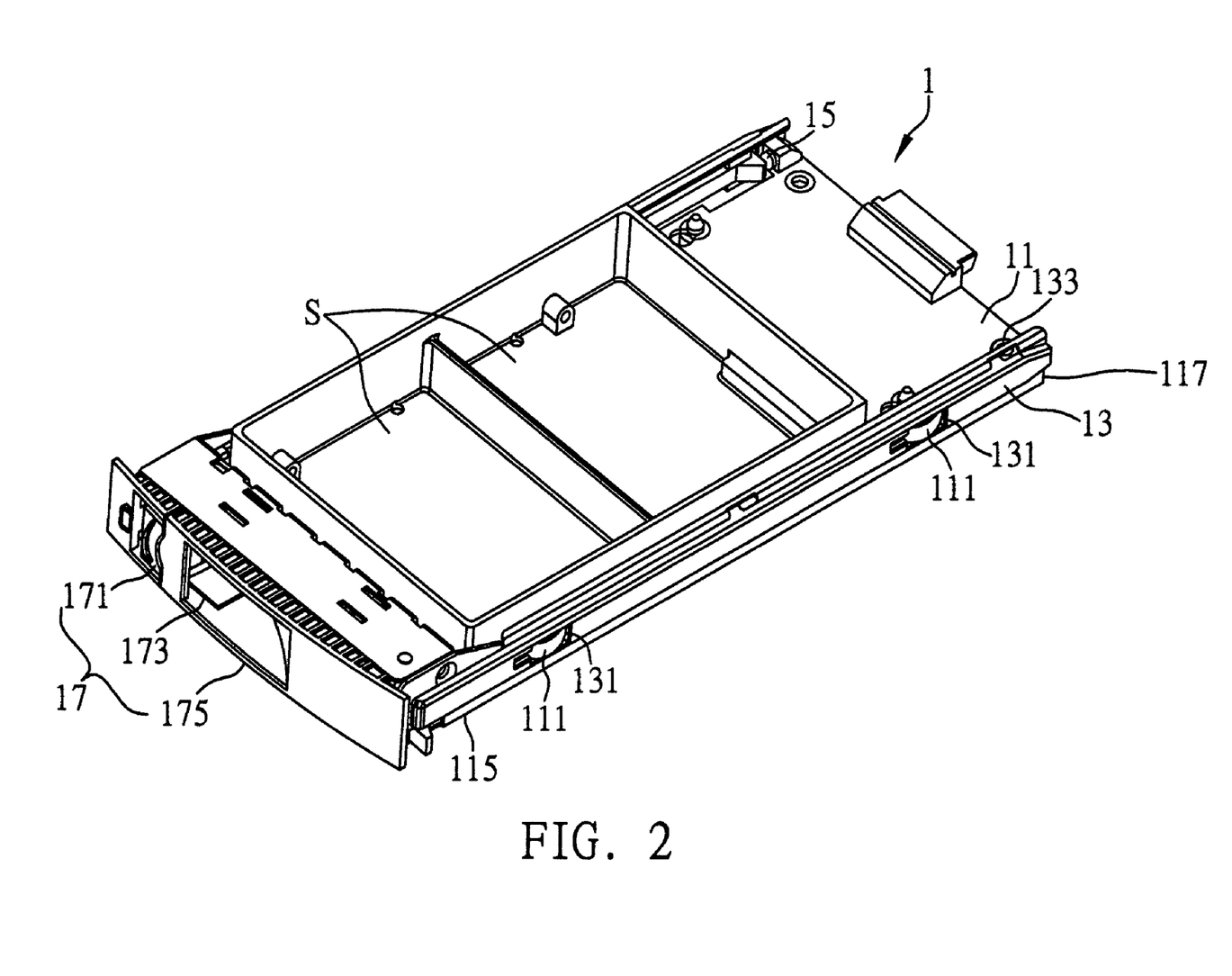
FIG. 2 is a schematic view of a drawer for a digital data storage device according to one embodiment of the invention.

Referring to FIG. 1 and FIG. 2, the drawer body 11 has two accommodating spaces S respectively dedicated to the reception of a digital data storage device. Each side of the drawer body has a plurality of (for example two) resilient members 111 and a plurality of (for example two) first openings 113. The resilient members 111 absorb the fit tolerance between the drawer and a fixing member (not shown) receiving the digital data storage device. Furthermore, the resilient members 111 serve as electrical grounding between the drawer and the fixing member. In this embodiment, the resilient members 111 are made of, for example, stainless steel. The resilient members 111 are integrally formed on the body 11 and protrude from the body 11.

Alternatively, the resilient members 111 may be individual stainless steel rail members.

It is noted that although the body 11 is illustrated as having the resilient members 111 and the two first openings 113, the scope of the invention also encompasses different numbers, shapes, arrangements, and configurations of the resilient members 111 and the first openings 113, which may vary according to the actual need.

The fixing member such as a cabinet used to receive the drawer is well known in the art and its detailed description therefore is omitted herein.

As illustrated, a light pipe 15 is further detachably mounted in the body 11 in a manner to linearly extend from the front end 115 of the drawer body 11 to the rear end 117 of the body 11. The light pipe 15 provides a light source for display purpose.

Figure 5:
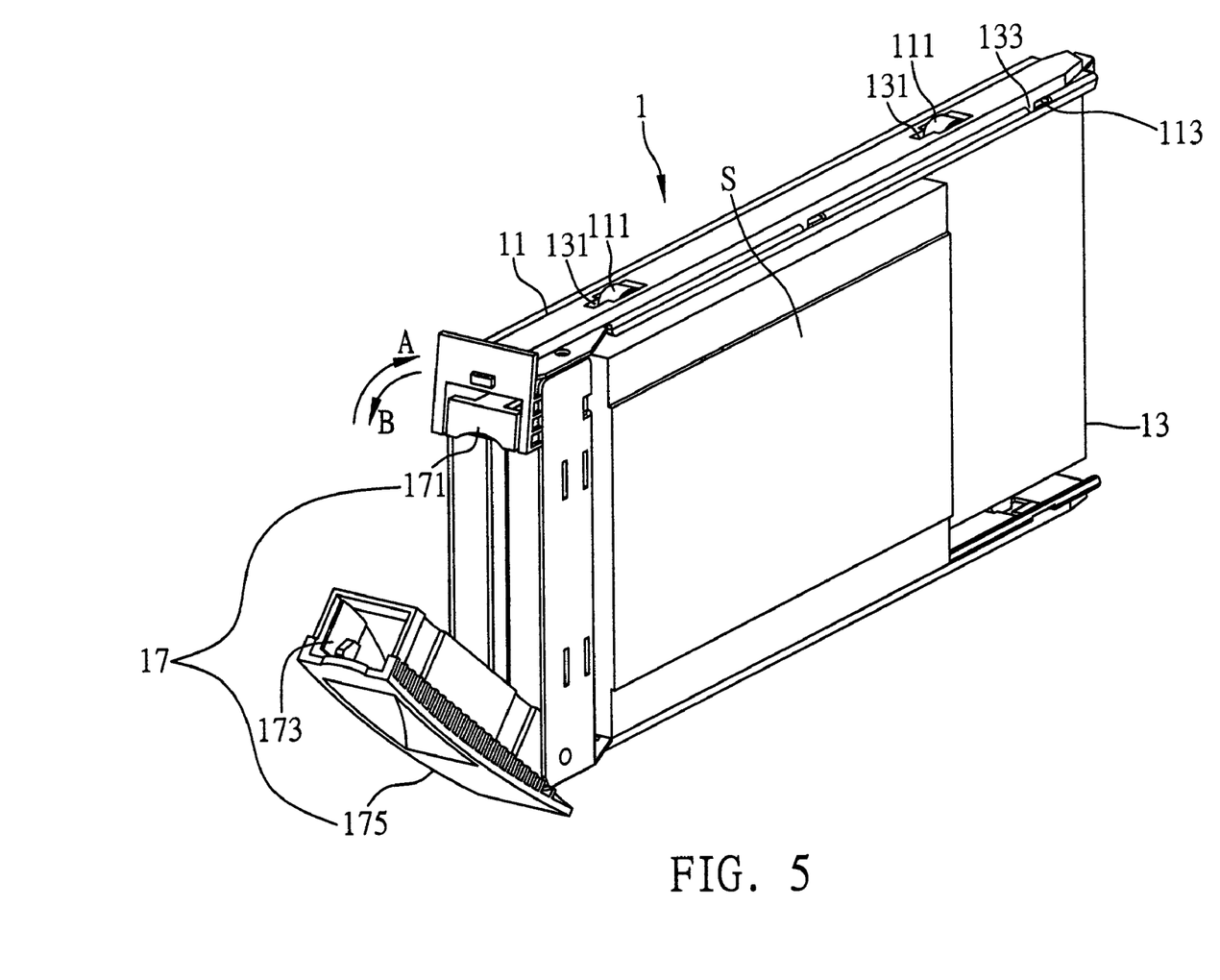
FIG. 5 is a schematic view illustrating the operation of a drawer for a digital data storage device according to one embodiment of the invention.

An actuator 17 is further pivotally mounted at the front end 115 of the body 11. The actuator 17 includes a latching element 171, a snapping element 173, and a pivotal handle 175. As shown in FIG. 5, the latching element 171 is, for example, a bolt/lock/fastener, and the snapping element 173 is, for example, a tenon. When the handle 175 pushes toward the front end 115 of the body 11, the snapping element 173 snaps fit with the latching element 171. When the left end of the latching element 171 is pushed, attachment between the latching element 171 and the snapping element 173 is released. Thereby, the handle is capable of pivoting between a first position A close to the front end 115 and a second position B far away from the front end 115.

The two vibration absorption members 13 are respectively formed with two second openings 131 and two fastening portions 133. The second openings 131 respectively receive the resilient members 111. The fastening portions 133 are formed to respectively correspond to the first openings 113, so that the vibration absorption members 13 thereby fasten in the corresponding first openings 113 through the fastening portions 133.

Each vibration absorption member 13 is a rail made of, for example, a plastic material, to provide a proper cushioning effect. The number, shape, and arrangement of the second openings 131 and the resilient member 111 may differ according to actual needs. The resilient members 111 slightly protrude through the second openings 131 to expand and overlap the vibration absorption members 13 in abutment against the vibration absorption members 13.

It is understood that the number, shape, and arrangement of the second openings 131 and resilient members 111 are not limited to the above embodiment, and may be modified so long as it allows the second openings 131 and the resilient members 111 to match each other. Furthermore, the exterior surface of each resilient member 111 and vibration absorption members 13 is not limited to that shown in the figures of the invention, and any adequate profile with flat surface will be also suitable in the invention. The design of the fastening portions 133 and the first openings 113 may also be varied so long as it enables snap fitting of the fastening portions 133 and first openings 113 with each other.

Figure 3:
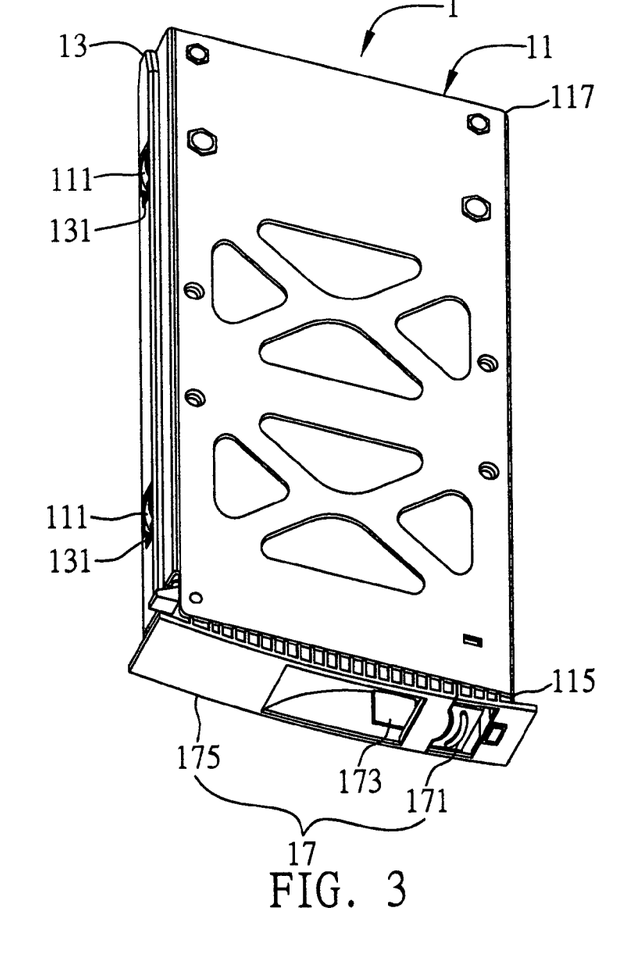
FIG. 3 is a bottom view of a drawer for a digital data storage device according to one embodiment of the invention.

When the vibration absorption members 13 are to be assembled inside the body 11, each fastening portion 133 of one vibration absorption member 13 corresponds to one first opening 113 at either side of the body 11. The fastening portions 133 then are pushed into the corresponding first openings 113 and the resilient members 111 respectively extend through the second openings 131. Thereby, the vibration absorption members 13 are fastened to either side of the body 11, as shown in FIG. 2 and FIG. 3.

Figure 4:
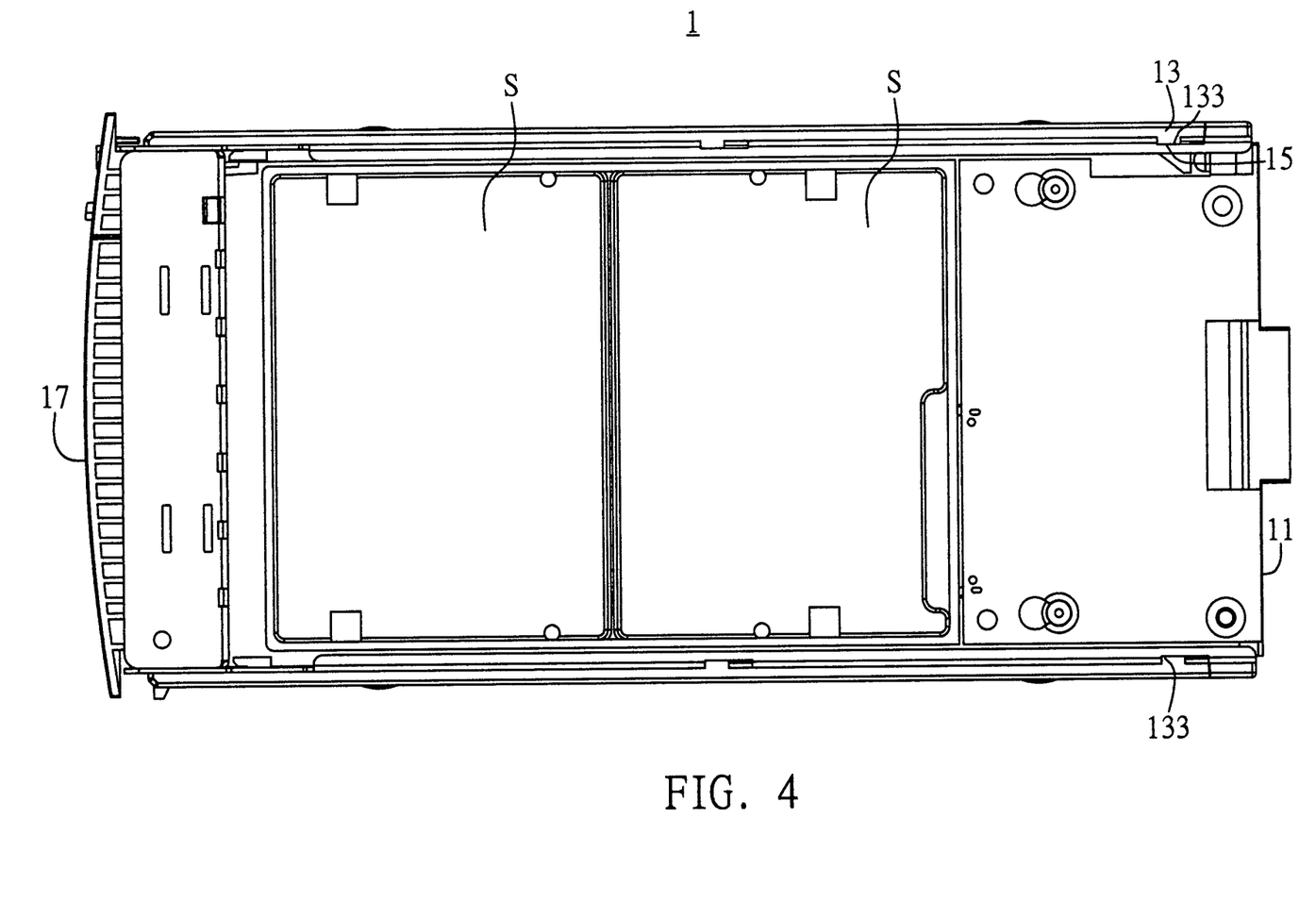
FIG. 4 is a top view of a drawer for a digital data storage device according to one embodiment of the invention.

Referring to FIG. 4, after the vibration absorption members 13 have been fastened with the body 11, the vibration absorption members 13 serve as cushions to absorb vibration when the drawer 1 is inserted in the fixing member of the electronic device. The resilient elements absorb the fit tolerance and serve as electrical grounding contacts between the drawer 1 and the fixing member.

Referring to FIG. 4, when one or both of the vibration absorption members 13 is to be disassembled from the body 1 due to damage, the fastening portions 133 of the damaged vibration absorption member 13 are separated from the first openings 113 to disassemble the vibration absorption member 13 from the drawer body 11 without the need of any tool. Fastening between the fastening elements 133 and the first openings 113 is not limited to the above snap-fit manner, and may also be modified so long as it allows both secure fastening of the vibration absorption members 13 with the drawer body 11 and easy disassembly from the body 11 without the need of any tool. According to a variant embodiment, the vibration absorption members 13 can be, for example, hooked or buckled to the drawer body 11.

Referring to FIG. 5, when the digital data storage device (in this embodiment, a hard disk drive) is to be retrieved from the drawer 1 of the invention, the latching element 171 of the actuator 17 releases the snapping element 173 and then the handle 175 pivotally moves from the first position A close to the front end 115 of the body 11 to the second position perpendicularly B far away from the front end 115. Thereby, the digital data storage device is pulled out of the drawer body 11. Referring to FIG. 2 and FIG. 4, although the above embodiments envision two accommodating spaces S for receiving the digital data storage medium, it is understood that the number of accommodating spaces is not limited to this design. Furthermore, the digital data storage medium placed in the corresponding accommodating space is not limited to a hard disk drive. The digital data storage medium may also be an extension card or other medium.

As described above, the invention therefore provides at least the following advantages.

The drawer for the digital data storage device according to the invention provides effective cushioning by means of the vibration absorption members mounted on either side of the drawer body. Thereby, the disadvantages in the prior art such as data alteration due to operational vibration of the digital data storage device can be avoided.

With the mounting of the resilient members on both sides of the drawer body according to the invention, the fit tolerance can be absorbed and the resilient members can serve as electrical contact between the drawer and the fixing member such that electrical contact failures are prevented, and electrical grounding is effectively achieved.

In the drawer for digital data storage device according to the invention, the vibration absorption members further are easily assembled to or disassembled from the drawer body 11. Therefore, the assembly/disassembly operations are less complex and less time-consuming.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A drawer for a digital data storage device, for use in an electronic device electrically connected with the digital data storage device for data transmission, the drawer comprising:
   a drawer body having at least one accommodating space for receiving the digital data storage device, wherein a plurality of resilient members and a plurality of first openings are formed on each of two sides of the drawer body; and
   two vibration absorption members detachably mounted on the two sides of the drawer body respectively, each of the vibration absorption members having a plurality of second openings and a plurality of fastening portions respectively corresponding to the resilient members and the first openings on the corresponding side of the drawer body, wherein the fastening portions of the vibration absorption members are engaged with the first openings of the drawer body so as to allow the vibration absorption members to provide the drawer body with a cushioning effect and vibration absorption, and the resilient members of the drawer body are engaged with the second openings of the vibration absorption members to absorb tolerance in assemblage and provide an electrical grounding effect,
   wherein the fastening portions are rigidly and nondetachably mounted on the vibration absorption members, and
   wherein the second openings are the only openings provided on the vibration absorption members.

2. The drawer of claim 1, further comprising a light pipe mounted in the drawer body.

3. The drawer of claim 2, wherein the light pipe extends from a front end of the drawer body to a rear end of the drawer body.

4. The drawer of claim 1, further comprising an actuator pivotally mounted in the drawer body.

5. The drawer of claim 4, wherein the actuator comprises a latching element, a snapping element detachably coupled to the latching element, and a rotatable handle, and wherein the latching element is capable of being pushed to decouple the latching element from the snapping element, so as to allow the handle to rotate between a first position close to a front end of the drawer body and a second position far away from the front end of the drawer body.

6. The drawer of claim 1, wherein the vibration absorption member is a plastic rail to provide the cushioning effect.

7. The drawer of claim 1, wherein the resilient member is made of stainless steel.

8. The drawer of claim 1, wherein the resilient members substantially protrude from the second openings and snap to abut against the vibration absorption members.

9. The drawer of claim 1, wherein the resilient members substantially protrude from the vibration absorption members and snap to abut against the vibration absorption members.

10. The drawer of claim 1, wherein exterior surfaces of the vibration absorption members and the resilient members are substantially flush with each other.

11. The drawer of claim 1, wherein the resilient members one each side of the drawer body are separate from and non-connected with other resilient members on a same side of the drawer body.

12. The drawer of claim 11, wherein the resilient members have an arcuate shape.

13. The drawer of claim 12, wherein the second openings have a size that the resilient member fills the second opening when engaged with the second opening.

* * * * *